[11] 3,610,725

[72] Inventor Peter Kaiser
 Middletown, N.J.
[21] Appl. No. 14,330
[22] Filed Feb. 26, 1970
[45] Patented Oct. 5, 1971
[73] Assignee Bell Telephone Laboratories Incorporated
 Murray Hill, Berkeley Heights, N.J.

[54] FLEXIBLE GAS LENS WAVEGUIDE
 7 Claims, 6 Drawing Figs.
[52] U.S. Cl. .................................................. 350/96 WG,
 250/201, 350/175 GN, 350/179
[51] Int. Cl. ..................................................... G02b 3/12,
 G02b 5/14
[50] Field of Search ...................................... 350/96 WG,
 175 GN, 179

[56] References Cited
UNITED STATES PATENTS
3,442,574 5/1969 Marcatili ........................ 350/179
3,506,331 4/1970 Kompfner ................... 350/96 WG X
FOREIGN PATENTS
1,140,908 1/1969 Great Britain ................ 350/179

*Primary Examiner*—John K. Corbin
*Attorneys*—R. J. Guenther and Arthur J. Torsiglieri ABSTRACT: In an optical waveguiding system using thermal gas lenses, realignment of an undulating optical beam with the optical axis of the guide is achieved by bending the lenses along two mutually perpendicular directions. Bending can be done manually or automatically using, for example, slow speed motors activated by beam position sensors.

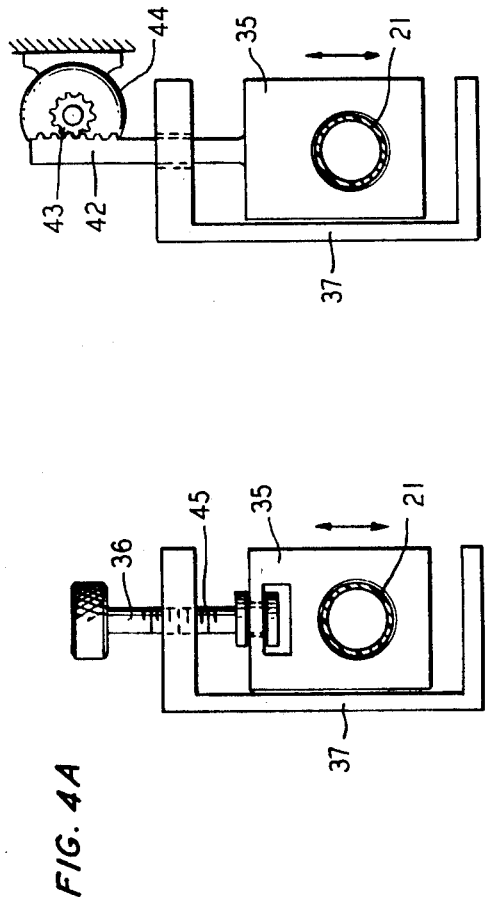
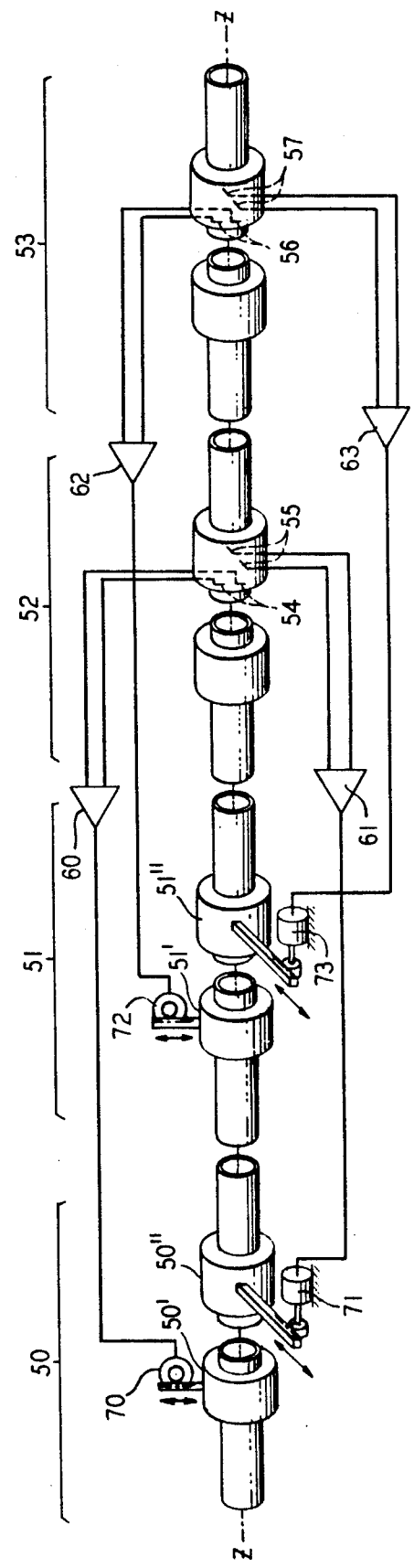

FLEXIBLE GAS LENS WAVEGUIDE

This invention relates to counterflow gas lenses and waveguiding system for guiding beams of optical wave energy.

BACKGROUND OF THE INVENTION

In an article by D. W. Berreman, entitled, "A Lens or Light Guide Using Convectively Distorted Thermal Gradients in Gases," published in the July 1964 issue of the Bell System Technical Journal, pp. 1,469–1,475, there is described a thermal gaseous waveguide particularly adapted for the transmission of optical wave energy. It is characteristic of the waveguide described by Berreman that a radially varying index of refraction is established across the wavepath by thermal means as a way of guiding the optical wave energy propagating therealong.

Since the publication of Berreman's article, a variety of gaseous waveguiding systems have been proposed. All such systems, however, have certain practical operational limitations which have been recognized and which will require correction if these systems are to become commercially feasible. Included among these limitations are the effects of gravity upon the rotational symmetry of the lenses, and deviation of the optical beam from the guide axis due to misalignment of the waveguide resulting from both intentional and unintentional bends in the system.

In my article entitled "An Improved Thermal Gas Lens for Optical Beam Waveguides," published in the Jan. 1970 issue of the Bell System Technical Journal, there is described a counterflow gas lens which significantly reduces gravitational aberrations in gas lenses. In such a lens the heated gas is radially exhausted from within the waveguiding region. Typically, the lens is arranged in two, longitudinally spaced sections, with the gas being injected at opposite ends and exhausted at the middle, hence the counterflow designation. Heating means surround the two sections to establish the desired thermal gradient across the flowing gas.

The present invention is directed to the second of the above-mentioned limitations and relates specifically to arrangements for realigning a misdirected beam along the axis of a waveguide made of counterflow lenses. The invention, however, is not limited to counterflow lenses.

Beam realignment, in accordance with the prior art, as represented by U.S. Pat. Nos. 3,442,574 and 3,466,111, is realized by transversely displacing entire lenses forming the waveguiding system. While this may be conveniently done with solid dielectric lenses, it is considerably less convenient to do when gas lenses are used. It is particularly inconvenient when thermal counterflow lenses are used since such lenses comprise two sections and a more complicated gas flow system.

It is, accordingly, the broad object of the present invention to simplify the means for producing beam redirection in thermal gas lenses.

SUMMARY OF THE INVENTION

A gas lens, in accordance with the present invention, is made of a flexible material, and beam redirection is accomplished by bending the lens rather than by translating the lens. In the specific embodiment to be described in greater detail hereinbelow, the heated sections of a counterflow lens are made of flexible material and surrounded by flexible heating means. The ends of the two lens sections are aligned with their centers along the guide axis and secured in position. Midway or so along each heated lens section, means are provided for bending the lens, where the plane of the bend of one section is perpendicular to the plane of the bend of the other of the two sections. The bend can be produced manually or by means of slow-speed motors automatically activated by beam sensors.

It is an advantage of the present invention that beam redirection is achieved by merely producing a slight bending of the lens structure, rather than by transversely displacing the entire lens.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIGS. 4A and 4B show two specific embodiments of the lens deflecting mechanism that can be used in connection with the present invention; and FIG. 5 shows an automatic beam redirecting system for use in connection with the present invention.

DETAILED DESCRIPTION

Figure 1:
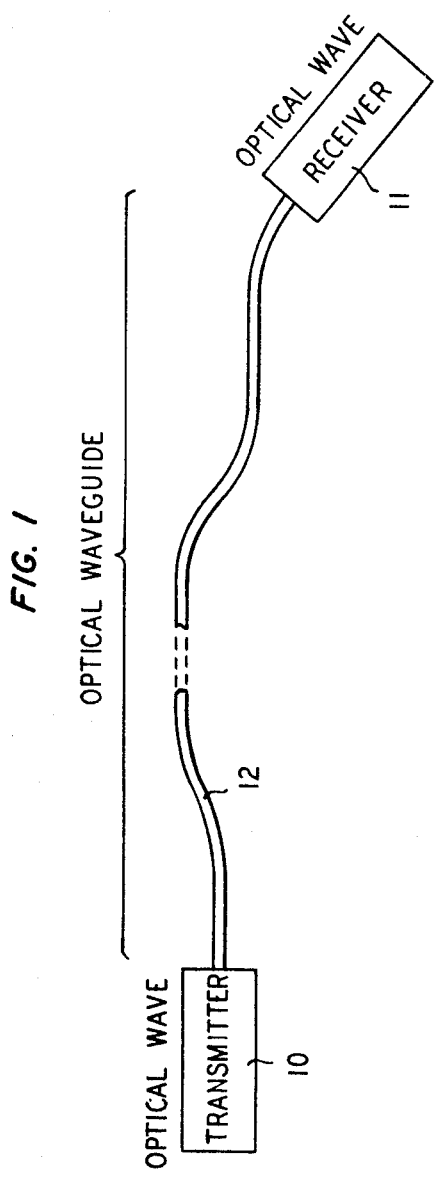
FIG. 1, included for purposes of explanation, show an optical transmission system.

Referring to the drawings, FIG. 1 shows an optical transmission system comprising an optical wave transmitter 10, an optical wave receiver 11 and an optical beam waveguide 12 connecting the transmitter to the receiver. In the communication system contemplated, the distance between transmitter and receiver will be long, typically of the order of many miles and, hence, there will generally be many changes in direction in order to conform to the available right-of-ways, terrain undulations, and to avoid natural obstructions. These, plus unintentional irregularities in the system, all tend to displace the guided beam off the guide axis. Since the displacements grow with increasing numbers of lenses, they eventually cause the beam to impinge upon the guide wall. As a result, means for redirecting the beam are generally necessary.

Figure 2:
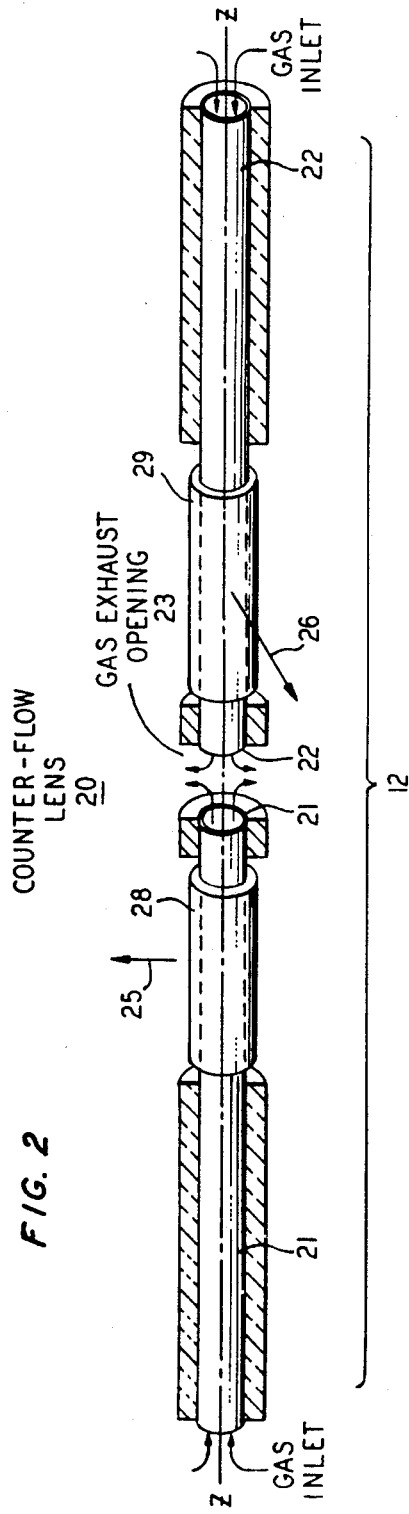
FIG. 2 shows a counterflow lens for use in an optical transmission system, modified in accordance with the present invention.

FIG. 2 shows a small portion of waveguide 12 comprising a counterflow lens adapted to redirect the optical beam guided therein. Only the essentials necessary to explain the invention and its operation are shown. For a more detailed description of the counterflow lens, see my above-identified article.

Referring again to the drawings, FIG. 2 shows a counterflow lens 20 comprising two elongated sections 21 and 22 of hollow, cylindrical conduit, longitudinally aligned along the guide axis Z—Z. Adjacent ends of the two sections are longitudinally spaced apart to form a gas exhaust outlet 23 therebetween. Heating means 28 and 29 surround adjacent portions of conduit sections 21 and 22, respectively. In operation, gas is injected into the far ends of the lens sections where it enters a cold laminar flow transition portion. After passing through the heated portions, it is exhausted through outlet 23. A radial thermal gradient is produced across the flowing gas as it traverses the heated portion of the lens sections. As is known, this thermal gradient causes focusing of the optical beam propagating through the lens.

As indicated hereinabove, beam redirection in accordance with the prior art involves displacing the entire lens in a direction transverse to the direction of wave propagation. In accordance with the present invention, beam redirection is achieved by making the heated portions of sections 21 and 22 of flexible material, and merely deforming these heated portions. More specifically, means are located at approximately the middle of the heated portion of each lens section for producing a slight bow therein. This bowing, as indicated by the two arrows 25 and 26, is directed along mutually orthogonal transverse directions, respectively, for the two sections. The motion can be induced either manually or automatically.

Figure 3:
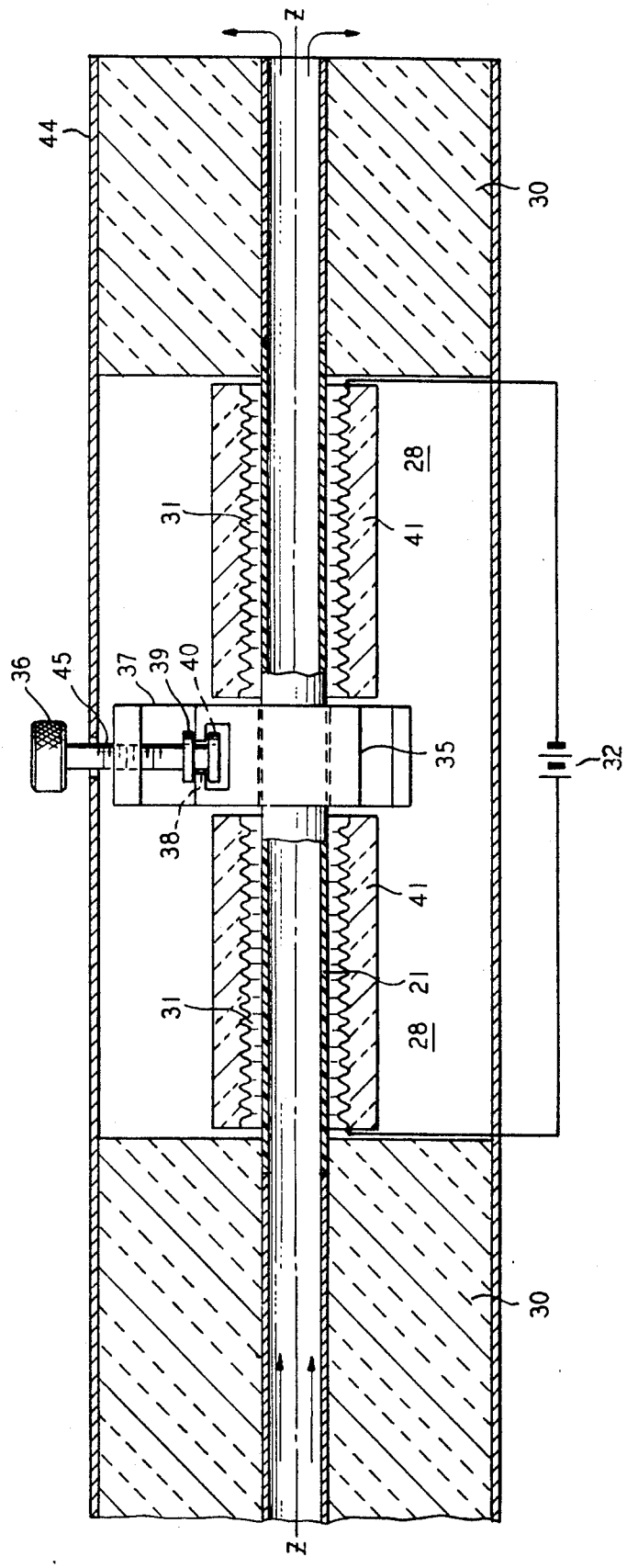
FIG. 3 shows the lens of FIG. 2 in greater detail.

FIG. 3 shows in greater detail one-half of the counterflow lens 20 shown in FIG. 2, including hollow, cylindrical section 21, surrounded near one end by heating means 28, and along the rest of its length by insulating material 30. The heated portion of section 21 is made of a thin, flexible material such as, for example, Teflon, or the like, or of a more rigid material suitably adapted so that it can be easily bent. The rest of section 21 can be made of either the same material, or of a more rigid material, such as a metal.

While the flow-transition portion and the exhaust end of section 21 are fixed in position, the center portion of the heated region therebetween is relatively free to move in a transverse direction. In the illustrative embodiment shown, this movement is produced by an arrangement which includes a collar 35 which surrounds the middle of the heated portion of section 21. The collar is displaced transversely by means of a rotatable member 36 which has a threaded portion 45 for mating with a threaded aperture in a supporting bracket 37. The lower end of member 36 passes through an aperture 38 in collar 35 and engages the latter by means of an upper and lower pair of shoulders 39 and 40. These maintain member 36 and collar 35 in a fixed position relative to each other. Thus, as member 36 is rotated, the threaded portion induces a transverse displacement of member 36 which is communicated to collar 35 and, in turn, to lens section 21, causing the latter to bow in the direction of the displacement of the collar.

Heating means for inducing a thermal gradient in the gas flowing through the lens is provided by means of a flexible heating element surrounding a portion of section 21. In FIG. 3, a bellows 31, having a prescribed direct current impedance, is used. Heat is generated by means of an electric current provided by a direct current source 32 connected across the bellows. Alternatively, a conductive spiral with very narrow grooves or other flexible conductor can be used as a heating element. Advantageously, the heated region is surrounded by a flexible insulating material 41.

The other half of lens 20 is similarly constructed except that the mechanism for bowing the lens section is rotated 90° relative to the first half, thereby affording beam control along two orthogonal directions.

FIG. 4A is a front view of the collar 35, showing lens section 21, rotatable member 36, and bracket 37. FIG. 4B is an alternative, motor driven arrangement comprising, as before, collar 35, lens section 21 and bracket 37. Rotatable member 36, however, is replaced by a nonrotatable member 42 adapted to engage a gear 43 at its upper end. The gear, which is driven by a motor 44, engages member 42 and imparts a transverse motion thereto as the motor rotates.

In an optical waveguide, an off-axis beam is deflected by a guide lens through an angle $\alpha$ given by $\alpha = x/f$, (1) where $x$ is the transverse displacement of the beam axis from the lens center; and $f$ is the focal length of the lens. If uncorrected, the beam will trace a path which oscillates about the guide axis with a periodicity that can be defined in terms of the lens spacing, their focal length and the beam displacement from the guide axis. Beam redirection is achieved by translating the lens axis so that the parameter $x$ in equation (1) is adjusted so as to reduce the angular deflection $\alpha$. In all, correction at two lenses will fully relocate an off-axis beam on the guide axis. Thus, complete beam redirection will involve pairs of lenses, or in the case of counterflow lenses, four half-lenses, as shown in the waveguiding system of FIG. 5.

In FIG. 5, four counterflow lenses 50, 51, 52 and 53 are shown. Pairs of photosensors 54, 55 and 56, 57 are located along the wavepath. Sensors 54 and 56 sense beam displacement along one transverse axis while sensors 55 and 57 sense beam displacement along a second transverse axis orthogonal to the first.

Each pair of sensors connects to one of the four differential amplifiers 60, 61, 62 or 63 which, in turn, drive one of four motors 70, 71, 72 or 73. The latter, when energized, rotate and bow the lens to which they are connected in the manner described hereinabove. Specifically, sensors 54 and 56 control motors 70 and 72 which operate upon half-lens sections 50' and 51' along one direction, whereas sensors 55 and 57 control motors 71 and 73 which operate upon half-lens sections 50'' and 51'' along an orthogonal direction.

In operation, an on-axis beam will induce equal signals in the sensors, resulting in no net output from the differential amplifiers to which the sensors are connected, and no realignments of the respective lenses. An off-axis beam, on the other hand, will produce unequal signals in one or more pairs of sensors, activating the motors to which the sensors are connected and, in turn, realigning the controlled lenses in a manner to redirect the beam and, thereby, to minimize the observed error. It will be noted that in this embodiment, displacement of the lens axis is achieved automatically.

The correction of larger beam displacements requires the introduction of relatively large bows. Since the smoothness of the laminar gas flow may be adversely affected thereby, and cause instabilities in the focusing action, it may be advantageous to use both halves of one counterflow lens for correction in one plane. In this case, complete redirection of a beam will require four lens sections.

Recognizing that a counterflow lens is no more than two closely spaced thermal gas lenses through which the gas flow is in opposite directions, it is obvious that the invention can be practiced in connection with other types of gas lenses, regardless of the particular gas flow arrangement. It will also be understood that the specific lens arrangements described hereinabove is merely illustrative of but one of the many possible specific embodiments which can represent applications of the principles of the invention. For example, in FIG. 3, the flexible portion of section 21 and bellows 31 can be made as a unitary member. Similarly, the portion of section 21 surrounded by insulator 30 can be omitted and the insulator itself made to serve as the waveguide enclosure. Thus, numerous and varied other arrangements can readily be devised in accordance with these principles by those skilled in the art without departing from the spirit and scope of the invention.

I claim:

1. For use in an optical beam-waveguiding system, an adjustable gas lens comprising:
    a first elongated section of flexible, hollow conduit through which a gas, having a radially varying refractive index, is caused to flow;
    and bending means disposed therealong for bowing said section of conduit.

2. The lens according to claim 1 wherein said varying refractive index is produced by flexible heating means surrounding said section of conduit.

3. The lens according to claim 1 wherein the ends of said section of conduit are fixed in position;
    and wherein means are located along said section of conduit for producing a transverse displacement therealong.

4. The lens according to claim 1 including a second section of flexible conduit, longitudinally spaced from said first section of conduit, through which a gas, having a radially varying refractive index, is caused to flow in a direction opposite to the direction of gas flow in said first section;
    and bending means for bowing said second section of conduit in a plane perpendicular to the plane of the bow of said first section.

5. The lens according to claim 1 wherein said bending means is manually operated.

6. The lens according to claim 1 wherein said bending means is automatically operated in response to beam position sensors disposed along said waveguide.

7. An optical beam-waveguiding system comprising:
    a plurality of longitudinally spaced gas lenses;
    and means for sensing the position of said beam with respect to a reference axis and for generating error signals when said beam direction deviates from said axis;
    characterized in that:
        portions of said lenses are made of flexible material;
        and in that bending means are associated with said system for bowing the flexible portions of said lenses in response to said error signals so as to minimize said signals.